United States Patent [19]

Brinkmann et al.

[11] Patent Number: 5,105,691
[45] Date of Patent: Apr. 21, 1992

[54] UNDER-THE-FLOOR LATHE

[75] Inventors: Dirk Brinkmann, Lünen; Uwe Leitloff, Hattingen, both of Fed. Rep. of Germany

[73] Assignee: Hoesch Maschinenfabrik Deutschland AG, Dortmund, Fed. Rep. of Germany

[21] Appl. No.: 661,808

[22] Filed: Feb. 27, 1991

[30] Foreign Application Priority Data

Mar. 3, 1990 [DE] Fed. Rep. of Germany ....... 4006667

[51] Int. Cl.$^5$ ............................................... B23B 5/32
[52] U.S. Cl. ..................................... 82/105; 409/165; 51/104; 51/106
[58] Field of Search ............... 82/104, 105; 51/104, 51/106; 409/199, 165

[56] References Cited

U.S. PATENT DOCUMENTS

| 3,203,286 | 8/1965 | Dombrowski | 82/104 |
| 3,598,017 | 8/1971 | Saari | 82/104 |
| 4,347,769 | 9/1982 | Dombrowski | 82/105 |
| 4,674,370 | 6/1987 | Gutöhrlein et al. | 82/104 |

FOREIGN PATENT DOCUMENTS

| 332489 | 9/1989 | European Pat. Off. | 82/105 |
| 2937819 | 3/1981 | Fed. Rep. of Germany | 82/104 |
| 1005764 | 9/1965 | United Kingdom | 82/104 |

Primary Examiner—Larry I. Schwartz
Assistant Examiner—Kevin J. Carroll
Attorney, Agent, or Firm—Max Fogiel

[57] ABSTRACT

An under-the-floor lathe for re-machining the wheels in railroad-vehicle wheel sets. It has two assemblies for each wheel in the set. Each assembly comprises an upright, a swiveling head, an axle-bearing support, a hold-down, two friction rollers that can be positioned against one of the wheels, and a friction-roller holder. At least one of the friction rollers in each holder is powered. Each holder rotates around an axis that travels along the mid-plane of the lathe. The object is to accelerate the machining action without using brakes that engage the friction-roller holders. Two pressure-application devices that generate opposite torques in relation to their associated pivoting axis are attached to each friction-roller holder.

5 Claims, 4 Drawing Sheets

UNDER-THE-FLOOR LATHE

BACKGROUND OF THE INVENTION

The invention concerns an under-the-floor lathe for re-machining the wheels in railroad-vehicle wheel sets that has two assemblies for each wheel in the set, each assembly comprising an upright, a swiveling head, an axle-bearing support, a hold-down, two friction rollers that can be positioned against one of the wheels, and a friction-roller holder, whereby at least one of the friction rollers in each holder is powered and whereby each holder rotates around an axis that travels along the mid-plane of the lathe.

An under-the-floor lathe of the aforesaid type is known from German Pat. No. 2 937 751 C2.

The machining action of a lathe of this type is accelerated by several brakes that engage the friction-roller holders to make it more difficult for the holders to pivot while the wheels are being reground.

The brakes that engage the friction-roller holders, however, are considered drawbacks in that they are rather expensive.

SUMMARY OF THE INVENTION

The object of the present invention is to improve an under-the-floor lathe of the aforesaid type such that its machining action can be accelerated without brakes that engage the friction-roller holders.

This object is attained in accordance with the invention in that two pressure-application devices that generate opposite torques in relation to their associated pivoting axis are attached to each friction-roller holder.

Each pivoting axis is positioned horizontal and moves up and down.

It is practical for each pivoting axis to be an axis of symmetry in relation to the axes of two friction rollers on one friction-roller holder.

Each pressure-application device consists, in accordance with another characteristic of the invention, of a cylindrical pneumatic bellows and lever transmission.

BRIEF DESCRIPTION OF THE DRAWINGS

One embodiment of the invention will now be specified with reference to the schematic drawing, wherein.

DESCRIPTION OF THE PREFERRED EMBODIMENTS

Figure 1:
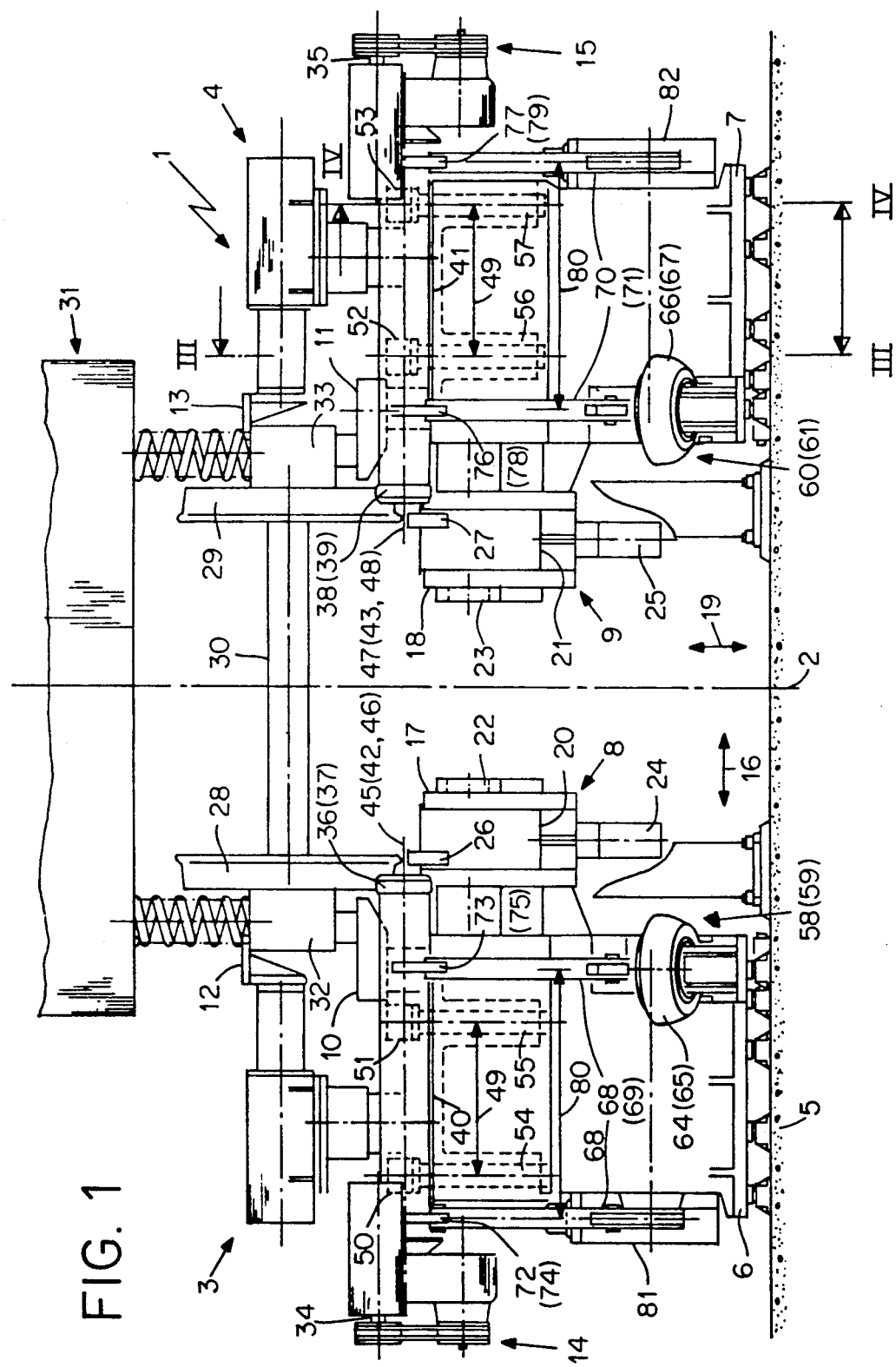
FIG. 1 is a view of an under-the-floor lathe with a railroad-vehicle wheel, showing part of the body of the vehicle that rests on the wheel set in conjunction with a section through part of the shop floor.
Figure 2:
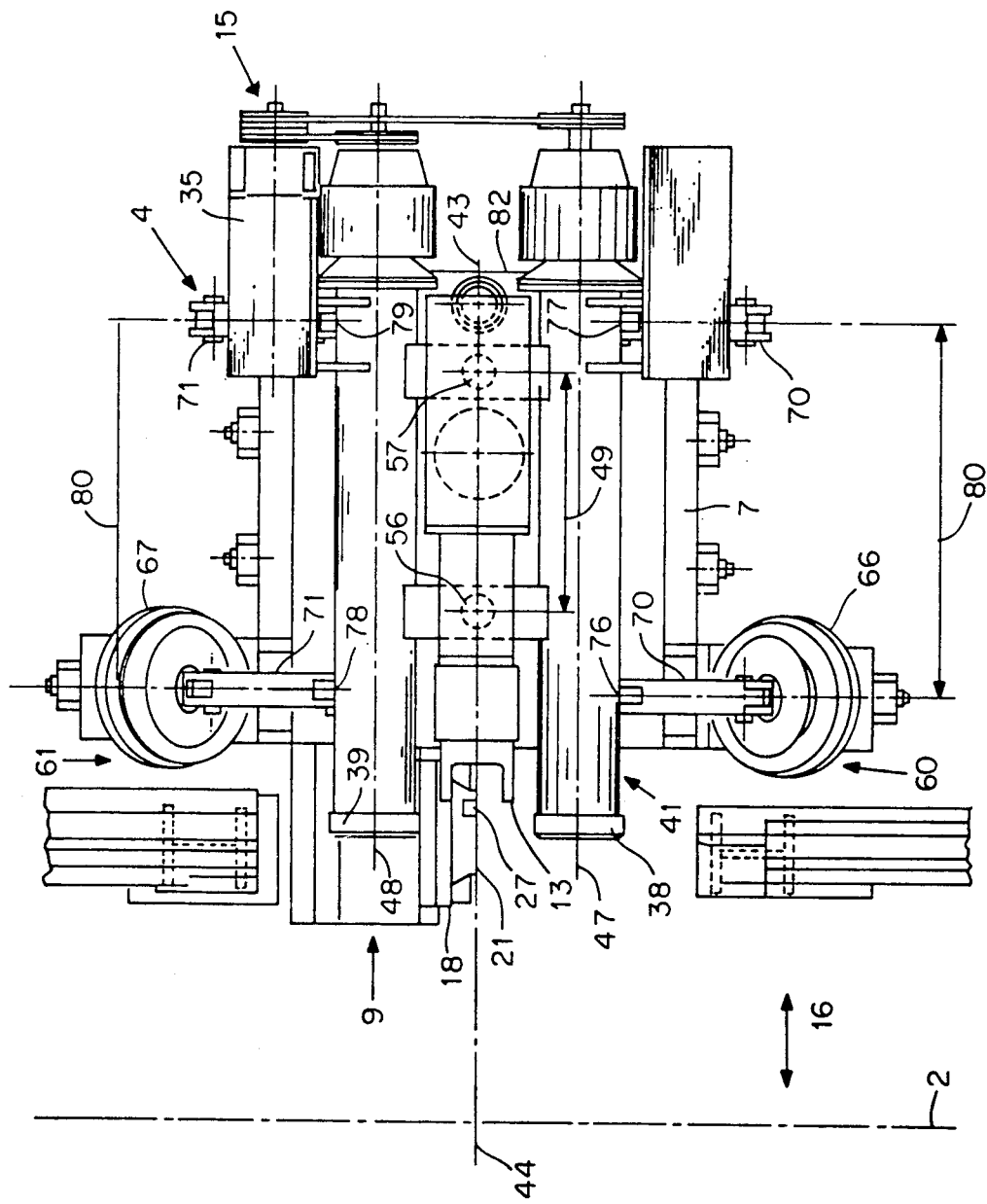
FIG. 2 is a larger-scale top view of the right-hand assembly.

An under-the-floor lathe 1 has two assemblies 3 and 4 positioned symmetrical with respect to the midline 2 of the track and secured to the floor 5 of the shop.

Each assembly 3 and 4 comprises an upright 6 and 7, a swiveling head 8 and 9, an axle-bearing support 10 and 11, a hold-down 12 and 13, and a friction-roller drive mechanism 14.

Each swiveling head 8 and 9 has one turning slide 17 and 18 that advances longitudinally (in the direction indicated by double-headed arrow 16) and one turning slide 20 and 21 that advances in a plane (in the direction indicated by double-headed arrow 19).

Each longitudinal turning slide 17 and 18 is powered by a motor 22 and 23 and each planar turning slide 20 and 21 is powered by another motor 24 and 25.

Mounted on each planar turning slide 20 and 21 is a turning tool 26 and 27 for re-machining each wheel 28 and 29 in a set 30.

Set 30, which is part of a railroad vehicle 31, is secured while wheels 28 and 29 are being re-machined on its axle-bearing boxes 32 and 33 by axle-bearing supports 10 and 11 and by hold-downs 12 and 13.

A motor 34 and 35 in each friction-roller drive mechanism 14 and 15 rotates two friction rollers 36, 37, 38, and 39.

Each pair of friction rollers 36, 37, 38, and 39 in each friction-roller drive mechanism 14 and 15 is mounted on a holder 40 and 41 that pivots around a horizontal axis 42 and 43. This axis travels up and down while remaining in the vertical mid-plane 44 of lathe 1.

The axes 45, 46, 47, and 48 of each pair of friction rollers 36, 37, 38, and 39 in one friction-roller drive mechanism 14 and 15 are parallel and symmetrical to the pivoting axis 42 and 43 of friction-roller holder 40 and 41.

Each horizontal and vertically traveling pivoting axis 42 and 43 comprises two articulating bearings 50, 51, 53, and 54 separated by a distance 49 and secured both in a friction-roller holder 40 and 41 and on a vertical positioning rod 54, 55, 56, and 57.

Figure 3:
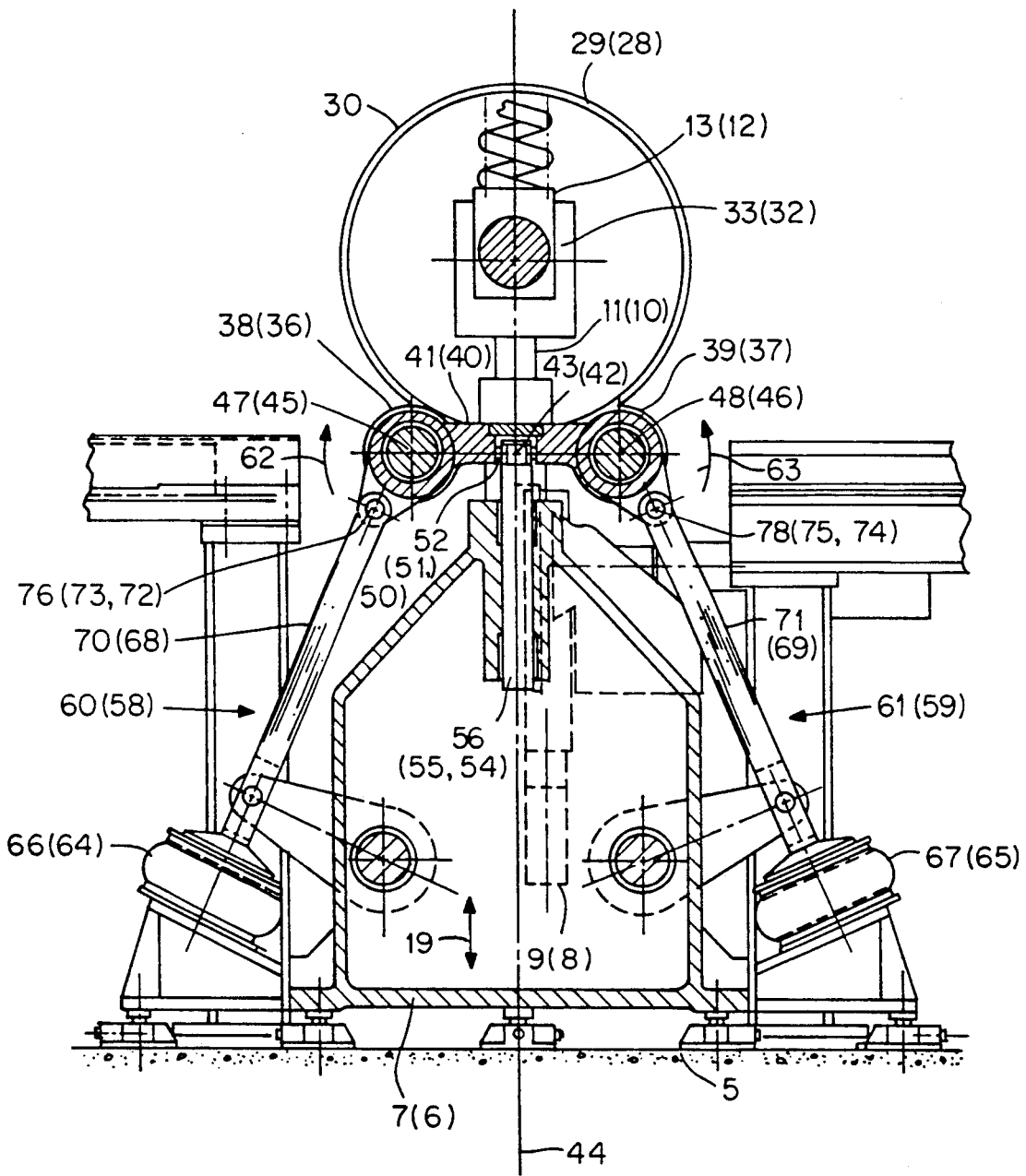
FIG. 3 is a larger-scale section along the line III—III in FIG. 1.
Figure 4:
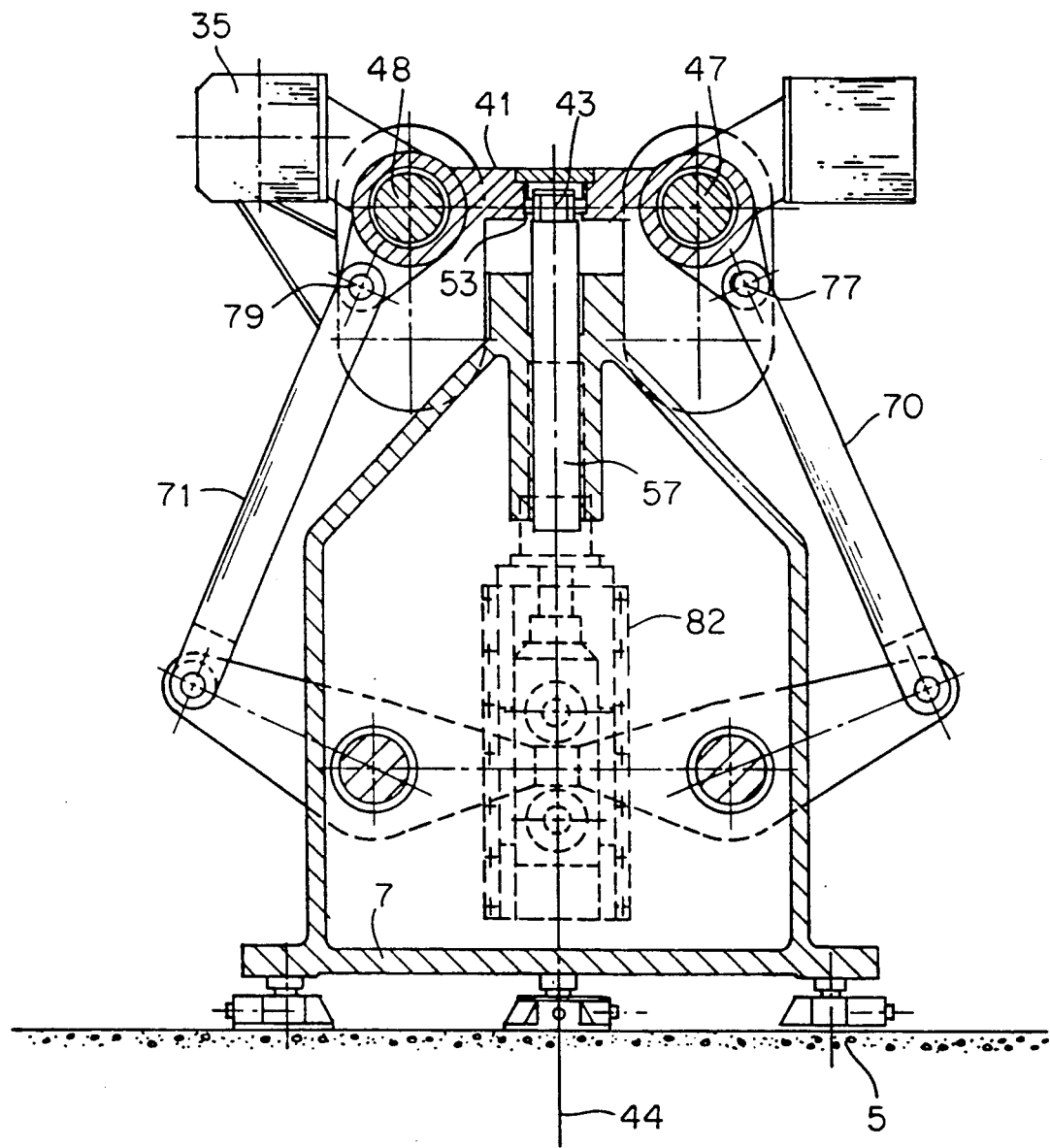
FIG. 4 is a larger-scale section along the line IV—IV in FIG. 1.

Friction rollers 36, 37, 38, and 39 are forced against the wheels 28 and 29 in set 30 by pressure-application devices 58, 59, 60, 61 articulated to each friction-roller holder 40 and 41 and generating opposite torques in the directions indicated by arrows 62 and 63 (FIG. 3).

Each pressure-application device 58, 59, 60, and 61 consists of a cylindrical pneumatic bellows 64, 65, 66, and 67 and a lever transmission 68, 69, 70, and 71.

Each pair of lever transmissions 68, 69, 70, and 71 is articulated at two points 72, 73, 74, 75, 76, 77, 78, and 79 to one friction-roller holder 40 and 41. There is a horizontal distance 80 between each pair of points 72 to 79.

Each friction-roller holder 40 and 41 is connected by its lever transmission 68, 69, 70, and 71 to a synchronizing device 81 and 82.

We claim:

1. A subfloor lathe with a midplane for remachining wheels in railroad wheel sets comprising two assemblies, each assembly being for a wheel in a wheel set, each assembly having an upright, a swiveling head mounted on said upright, an axle-bearing support for supporting an axle bearing of the wheel set while wheels are being remachined, hold-down means for holding in place the wheel set while the wheels are being remachined; two friction rollers positionable against a wheel to be remachined; and friction roller holding means for holding said friction rollers; drive means for driving at least one friction roller in said friction roller holding means; means for rotating said friction roller holding means about an axis moving along said midplane of the lathe, said friction rollers being arranged in pairs for each friction roller holding means; pressure application means pivoted on said friction roller holding means for generating opposite torques in relation to said axis moving along said midplane of the lathe.

2. A subfloor lathe as defined in claim 1, wherein said axis moving along said midplane of the lathe is positioned horizontally and moves up and down.

3. A subfloor lathe as defined in claim 1, wherein said axis moving along said midplane of the lathe is an axis of symmetry relative to axes of two friction rollers on said friction roller holding means.

4. A subfloor lathe as defined in claim 1, wherein said pressure application means comprises a cylindrical pneumatic bellows and lever transmission means.

5. A subfloor lathe with a midplane for remachining wheels in railroad wheel sets comprising two assemblies, each assembly being for a wheel in a wheel set, each assembly having an upright, a swiveling head mounted on said upright, an axle-bearing support for supporting an axle bearing of the wheel set while wheels are being remachined, hold-down means for holding in place the wheel set while the wheels are being remachined; two friction rollers positionable against a wheel to be re-machined; and friction roller holding means for holding said friction rollers; drive means for driving at least one friction roller in said friction roller holding means; means for rotating said friction roller holding means about an axis moving along said midplane of the lathe, said friction rollers being arranged in pairs for each friction roller holding means; pressure application means pivoted on said friction roller holding means for generating opposite torques in relation to said axis moving along said midplane of the lathe; said axis moving along said midplane being positioned horizontally and moving up and down and being an axis of symmetry relative to axes of two friction rollers on said friction roller holding means; said pressure application means comprising a cylindrical pneumatic bellows and lever transmission means.

* * * * *